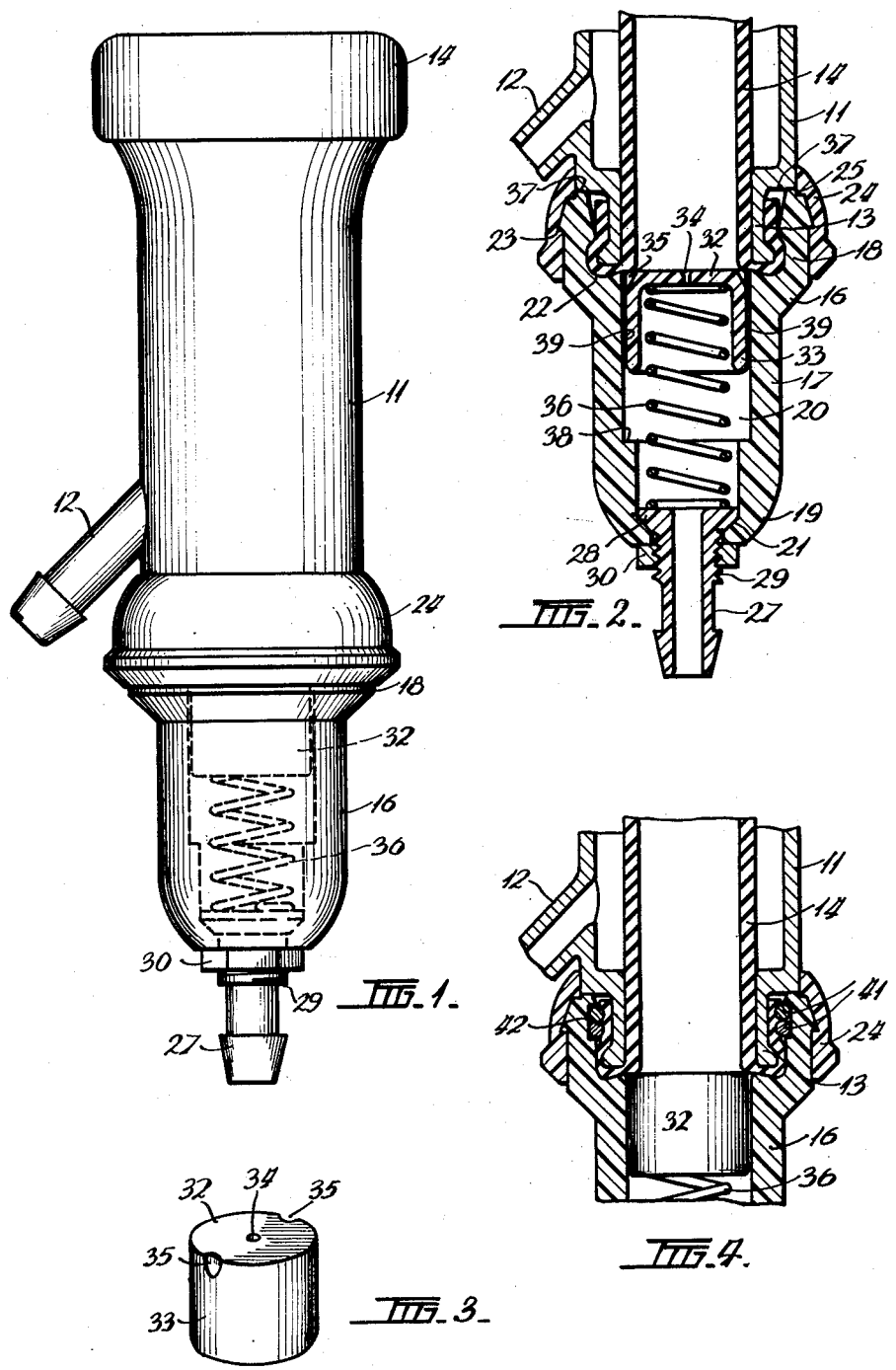

United States Patent Office 2,986,117
Patented May 30, 1961

2,986,117
MILKING MACHINE TEAT CUPS

Louise Ronaldson, 16 William St., South Yarra, near Melbourne, Victoria, Australia Filed May 19, 1959, Ser. No. 814,248
2 Claims. (Cl. 119—14.38)

This invention relates to improvements in milking machine teat cups, and it refers particularly to teat cups of the type having a body portion or carrier wherein is fitted the milking machine inflation, and a bowl or coupling cap fitted to one end of the body portion or carrier, the bowl having a nipple element for connecting the teat cup to a milk delivery line and the carrier having a nipple for connection of the pulsator suction line to the teat cup.

In milking machine teat cups as hitherto made it has been the practice to make the bowl of metal and to have the nipple at its lower end formed as an integral part.

It is known that cows develop certain diseases or complaints which affect the delivery of milk, and in some cases the milk is contaminated, as by an influx of blood. In such a case it is necessary to reject all of the affected milk, and in order to provide means for detecting the particular cow causing the contamination it is necessary to provide an inspection bowl of transparent material in the milk supply line so that the source of contamination can be detected. Then, of course, the particular cow has the teat cups removed from it so as to prevent further soiling of the milk. However, in many instances it would still be possible to obtain milk from that cow as it may be that only one teat is causing the defect in the milk supply. But, as yet, it has not been contemplated to provide means for isolating the affected teat on the particular cow.

Then, too, a cow can suffer from a defect wherein one teat will not provide milk, and yet there is an output of milk from the cow. Obviously, the provision of a single inspection bowl for the milk line from a cow will not provide means for detecting that defect as an inspection of the milk-flow from the cow will show that milk is being delivered. Thus, the complaint or disease of the cow is not detected as soon as it should be, and the maximum supply of milk is not obtained from the cow.

It is, therefore, an important object of the invention to provide individual inspection means for each teat cup so that the flow of milk from each teat may be readily observed, and in the event of any fouling or failure in the milk supply from any one teat appropriate action taken to disengage the teat cup from the affected teat.

However, if any one of a set of teat cups is to be disengaged from a cow then it is necessary to provide means for shutting off the milk line of the individual teat cups so that there will not be any substantial drop in suction in the remaining cups when one or more cups are removed. It is, therefore, another object of the invention to provide, in a teat cup, valve means for closing the passageway through the teat cup.

In use of teat cups of milking machines it sometimes occurs that a teat cup will fall off or be knocked off, and if that occurs there is always a likelihood of impurities entering the milk line. Yet another object of the invention is to provide means, in a milking machine teat cup, for shutting off the vacuum or suction through the teat cups in the event of inadvertent dislodgment thereof so as to prevent, or greatly restrict, the likelihood of impurities entering the milk line. A dependent object is to provide means for shutting off the suction through a milking machine teat cup such that when the teat cup is reapplied to a cow the suction will be automatically restored.

In order to provide individual inspection means for each teat cup so that any defect in the milk supply may be observed by checking the flow of milk from each quarter of the cow when the teat cups are applied I make a bowl or coupling cap, for attachment to the inflation casing so as to constitute part of the teat cup, composed or made of transparent material such as methyl methacrylate or other suitable organic synthetic resinous or plastic material or of glass.

However, if the bowl be made of transparent material such as glass or a clear organic synthetic resinous or plastic material such as methyl methacrylate, and have a nipple element formed integrally with it so as to enable the claw tube to be readily connected thereto there is a substantial likelihood of breakage or cracking occurring in the vicinity of the nipple element after a relatively short period of service, apparently in consequence of the extremes of temperature to which the bowl is subjected in the washing of the bowl to maintain necessary standards of cleanliness. Also, of course, there is a great likelihood of breakage occurring if the teat cup is knocked down, due to the relatively brittle nature of the material from which the bowl is made and, in particular, due to the relatively small sectional thickness of the material at the junction of the nipple to the remainder of the bowl and the likelihood of the nipple bearing the force of impact—the nipple being on the underside of the bowl.

Accordingly, a further object of the invention is to provide a bowl with a nipple element wherein the bowl is of transparent material and the nipple element is so connected thereto that the parts will not have any undue tendency to break or crack.

That may be achieved by providing a nipple element made as a separate part and detachably fitting it to the bowl. However, any such fitting must be accomplished in such a manner that there will be an efficient sealing of the junction of the two parts, that the parts may be readily taken apart for purposes of cleaning, and yet ensure that there is little likelihood of bacteria being harboured at the junction. Therefore, it is a still further object of the invention to provide a bowl, having a nipple attached thereto, such that there will be an efficient sealing of the nipple element in the bowl, that the parts may be readily taken apart for cleaning purposes, and wherein there will be little, if any, likelihood of bacteria collecting and being harboured at the points of connection of the two parts.

According to the invention there is provided, in a teat cup for a milking machine, a bowl made of transparent material of the nature of methyl methacrylate and having at its lower end an opening, and a tubular nipple element fitted detachably in the opening. The internal surface of the bowl, where it extends about the opening for the nipple element, is of tapering or inverted conical shape and the inner end or head portion of the nipple element is made the same tapered shape so that there is a tight neat fit of the head of the nipple element in the lower end of the bowl—thereby reducing considerably the likelihood of collection of bacteria. The nipple element is screw-threaded for a portion of its length below the head so that it is adapted to be fastened in position by a nut engaged on the screw-threaded shank and pressing on the lower end of the bowl. It is preferred that the nipple element be made of polyethylene, or other somewhat resilient plastic material.

The invention also provides, in a teat cup for a milking machine, an automatic cut-off valve interposed in the milk passageway and operative under normal working conditions to permit milk to flow past the valve to the milk line attached to the teat cup but under abnormal conditions— when atmospheric air has relatively free access to the interior of the milk line—to close and prevent a substantial inflow of air to the milk line. The valve has a valve head which is biased away from a valve seating, and away from the nipple at the lower or outlet end of the bowl.

If the bowl be attached to the end of the inflation casing so that the end of the inflation is in the bowl, and doubled back about the end of the casing, then the return of the inflation operates as a stop for limiting the travel of the valve.

In order that the invention may be clearly understood I shall now describe a preferred construction of teat cup for milking machines incorporating the several features of the invention, and also a modification thereof. These two constructions are illustrated in the attached drawing, wherein:

Fig. 1 is a side elevation of the teat cup;

Fig. 2 is a vertical axial section through the lower end portion of the inflation casing and the bowl having the nipple element attached to it;

Fig. 3 shows the valve head, in perspective; and

Fig. 4 is a part vertical axial section through the lower end portion of the inflation casing and the top of the bowl, showing the modified form of the invention.

Reference is made initially to Figs. 1, 2 and 3.

The milking machine teat cup illustrated in the drawings has an inflation casing 11 provided with a nipple 12 for the attachment thereto of an air line from a pulsator and, at the lower end of the casing, a beaded neck portion 13 of somewhat reduced diameter. The milking machine inflation 14 is fitted to the casing 11 so that its head portion fits about the top of the casing 11, its intermediate tubular portion extends through the casing 11 from the top to the bottom thereof, and its lower end portion is bent back about the neck portion 13 in a return—see Fig. 2.

The bowl 16, fitted to the lower end of the casing 11, is made of a transparent plastic material such as methyl methacrylate and it has an intermediate portion 17 of substantially cylindrical shape, an enlarged upper end portion 18 and a lower end portion 19 having an opening through it. A chamber 20 of substantially circular cross-section is provided in the intermediate portion, and the lower end portion of said chamber is smaller in diameter than the upper end portion. At the lower end of the chamber 20 there is a tapered seating 21. The enlarged upper end portion 18 of the bowl is in the form of an upwardly-extending circular flange and there is, at the lower end thereof, an internal seating 22 of arcuate shape. On the outer surface of the portion 18 is a circumferential ridge 23 and near the upper end of the part 18 is a circumferential recess or groove. A ring-like member 24 of somewhat resilient plastic material such as polyethylene is fitted about the portion 18 so as to cover, and protect, the junction of the upper end of the bowl 16 and the lower end portion of the casing 11, said member having an internal recess adapted to accommodate the ridge 23 and an internal circular ridge 25 adapted to engage in the circumferential recess or groove in the upper end of the part 18 so as to locate the member 23 in position on the enlarged part 18 of the bowl 16.

A nipple 27, preferably made of polyethylene or other resilient plastic material, is fitted in the lower end portion 19 of the bowl, said nipple 27 having a head 28 of tapered shape adapted to engage tightly with the seating 21 of said bowl 16, and a screw-threaded shank 29 which fits through the opening in the lower end portion 19. A nut 30 is engaged on the shank 29 and when it is screwed tightly against the lower end of the bowl 16 the tapered head 28 is drawn tightly on to the seating 21. If desired, a lock nut may also be engaged on the shank 29 to ensure that the nipple 27 will not inadvertently become loose in its engagement in the bowl 16.

Mounted in the bowl 16, in the chamber 20, is a valve head 32 having a skirt 33 which fits neatly but slidably in the chamber 20, an axial opening 34 in the top of the valve head 32 and openings 35 in the top edge portion of said valve head. A compression spring 36 is engaged with the valve head 32 so as to press said valve upwardly, the lower end of the spring being seated on the top surface of the nipple head 28.

In the assembly of the composite teat cup the inflation 14 is fitted into its casing 11 so that the head thereof is seated neatly on the top of the casing and the lower end is turned back over the beaded neck 13. Then the bowl 16, having the nipple 27 securely fitted to its lower end and the spring 36 and valve head 32 mounted within it, is forced on to the lower end of the casing 11 so that the enlarged portion 18 of the bowl fits about the beaded neck 13 and the end portion of the inflation. When the bowl 16 is firmly on the casing 11 the portion of the inflation 14 where it fits around the beaded lower end of the neck 13 seats firmly in the seating 22 in the upper end portion of the bowl so as to effect a sealing of the connection between the two parts 16 and 11, and the upper end of the bowl will be in contact with or close to the shoulder 37 near the lower end of the casing 11. Finally, the ring-like member 24 is fitted over the enlarged bowl-portion 18 so as to provide a protective covering about what is a relatively vulnerable part of the bowl 16 and thereby shield it from direct knocks.

As there is a resilient connection between the nipple 27 and the bowl 16 the tendency towards cracking or breaking of the bowl—due to conditions in service and/or variations in temperature such as would be encountered in cleansing operations—will be almost eliminated.

The valve head 32 is biased by the spring 36 towards the portion of the inflation 14 where it is bent about the beaded neck 13 and, therefore, that portion of the inflation constitutes a seating or stop to limit the linear movement of the valve head in one direction. The valve head is reciprocable in the chamber 20 and the lower end of the skirt 33 is adapted to engage with the shoulder 38 between the lower end portion of the chamber 20 and the upper portion thereof. When a strong suction is applied to the chamber 20 through the nipple 27 the valve head 32 will be drawn downwardly against the pressure of the spring 36 until the lower end of the skirt seats on the shoulder 38 so as to largely shut off the flow of air through the bowl 16. Of course, the bleeder opening 34 in the top of the valve head 32 will permit a small amount of air to be drawn through the teat cup, but not such a quantity as to materially effect the suction to other teat cups used in association with that having the closed valve.

In normal milking operation there is substantially the same degree of suction on both sides of the valve head 32 and, therefore, the valve head is influenced to the raised position as shown in Fig. 2. That is its normal operative milking position, and in that position milk can flow past the skirt 33, there being a small clearance between the outer surface of said skirt and the internal surface of the bowl 16, as indicated at 39. Thus, the milking operation can continue. However, if the teat cup should become, or be, detached from the cow atmospheric air is admitted to the interior of the inflation 14 through the open upper end thereof and the valve head 32 is forced downwardly against the pressure of spring 36 until the lower end of the skirt 33 engages with the shoulder 38. Then, a substantial inrush of air to and through the bowl 16 will be prevented.

The bleeder hole 34 in the valve head 32 allows a minor suction bleed through it, so that when the teat cup is replaced on the cow such suction through the hole 34 will reduce the pressure acting on the valve head 32 and, therefore, the valve head will be forced away from the seating 38 by the spring 36 and to its normal milking position, enabling milking to proceed. In this regard, the strength of the spring 36 is preferably such that the valve head will be biased away from the seating 38 when the pressure in the chamber 20 is reduced to below that of the outside atmosphere but before the degree of suction in the chamber reaches that in the line below the valve, thereby increasing the speed at which the teat cups can be applied during milking operations.

As the bowl 16 is made of clear plastic material the vacuum shut-off valve located therein will be clearly visible in normal circumstances, and the milkflow through the bowl will also be clearly visible when the device is in use. As the milk flows over the outer surface of the valve head 32 it must flow down the inner surface of the bowl 16 as a film, and any straining of the milk, as with a small quantity of blood, will be immediately apparent.

The transparent bowl 16 provides quite a number of advantages—the milk flow from each separate teat may be observed, it may be noted at a glance when the milking of a cow has been completed, and faulty quarters of the cow may be detected immediately the teat cups are applied.

Reference is now made to the construction illustrated in Fig. 4. In order to accommodate the varying wall thicknesses of different inflations two spring rings 41 of the nature of circlips are set in a recess 42 provided on the inner surface of the enlarged upper end 18 of the bowl 16, so that the bowl 16 may be pressed on to the lower end of the inflation casing 11, and a good connection made, without need to use any undue force. Thus, the bowl 16 may be made to suit inflations of maximum wall thickness and it will still be efficient, to provide a satisfactory seal, with inflations of minimum wall thickness. In order to provide for continuity of the seal the rings 41 are preferably arranged so that the opening in one ring is diametrally opposed to the opening of the other.

It will be appreciated that the scope of the invention is not to be limited to the specific constructions described above as the ambit of the invention is to be limited only by the appended claims.

What I claim is:

1. A nipple element assembly adapted to be detachably fitted into a teat cup of a milking machine comprising a nipple element which has a circular cross-section and is made of a resilient plastic material having a tapered head portion with a circular ridge therein which is adapted to fit into a circumferential groove in a tapered seating opening in the bowl of the teat cup, an intermediate portion of substantially cylindrical shape, and a lower end portion with an internal seating shoulder and bottom opening, a nipple with a tapered head and screw-threaded shank which fits into the bottom opening of the nipple element, a nut on the shank screwed up to draw the tapered head of the nipple against the seating shoulder of the nipple element, and a valve assembly consisting of a spring which engages the tapered head of the nipple and the inside of a cup-shaped valve head, said valve head having at least one opening in the upper edge portion of the face thereof and being operative to seat on the valve seat formed in the intermediate portion of the nipple element against the pressure of the spring means under the influence of suction applied to the nipple.

2. The nipple element of claim 1 in which the valve head has a bleeder hole in the face thereof and two openings in the upper edge portion of the face thereof.

References Cited in the file of this patent

UNITED STATES PATENTS

| | | |
|---|---|---|
| 1,705,293 | Horthy et al. | Mar. 12, 1929 |
| 2,073,737 | Ellison | Mar. 16, 1937 |

FOREIGN PATENTS

| | | |
|---|---|---|
| 129,177 | Australia | Sept. 17, 1948 |
| 737,834 | Great Britain | Oct. 5, 1955 |